March 4, 1969 A. F. PODELL 3,431,361

FM MULTIPLEX ADAPTER

Original Filed May 22, 1962

INVENTOR.
ALLEN F. PODELL
BY
Robert Ames Norton
ATTORNEY

United States Patent Office 3,431,361

Patented Mar. 4, 1969

3,431,361

FM MULTIPLEX ADAPTER

Allen F. Podell, Dodoma, Tanzania, assignor to Adams-Russell Co., Inc., Waltham, Mass., a corporation of Massachusetts Original application May 22, 1962, Ser. No. 196,727, now Patent No. 3,189,836, dated June 15, 1965. Divided and this application Apr. 28, 1965, Ser. No. 451,444
U.S. Cl. 179—15 2 Claims
Int. Cl. H04j *1/021*

ABSTRACT OF THE DISCLOSURE

A multiplex adapter for FM tuners which have a low impedance output, such as a cathode follower, consists of only two pairs of diodes connected in opposition with a high impedance multiplex frequency oscillator connected to the junctions of the diodes and an input circuit from the low impedance output source of the FM tuner being connected to one diode of each pair. Output circuits are connected to the other two diodes of each pair and provided with a simplified, multiplex frequency filter. Because of the low impedance input to each pair of diodes the relatively higher impedance switching signal from the multiplex frequency oscillator is greatly attenuated and only a very slight amount is present in the final outputs so that very simple filtering means eliminate this small residual signal. It is not necessary to have the two pairs of switching diodes balance to ground and only two pairs are used as against the customary four pairs of diodes.

*Related application*

This application is a division of my copending application Ser. No. 196,727, filed May 22, 1962 and now Patent No. 3,189,836, June 15, 1965.

*Background of the invention*

The problem of switching outputs and of mixing signals of two frequencies are frequently encountered in electronic circuits. For these purposes it has been proposed to use pairs of diodes connected in opposition, that is back to back or front to front. Such a pair has three points at which inputs or outputs can be connected, namely the two ends of the diodes and the junction between them. In switching it is customary to connect the signal to be switched and the switch control signals to the two ends of the diodes and the output to their center connection, but there is one proposal described in Patent 2,959,690 in which diodes arranged in opposed connections have been used with the switching control signals connected between the diodes. In this case, however, the same switching controls are connected in reverse phase to the output from one diode, the input signals going to the other. This has required fairly complex circuits utilizing either vacuum tubes or a complex diode bridge. The reason for these circuits is to eliminate switch signal frequency from the output. When properly designed these switch circuits operate satisfactorily. However, they require a large number of elements.

*Summary of the invention*

In one phase of the present invention it has been found that with suitable choice of circuit element values and a simple filter in the output circuit the same degree of freedom from switching signal frequency in the output is obtained with fewer elements and in a simpler circuit. The simple circuits referred to are SPST switches. If an SPDT is needed, two pairs of diodes and two filters are required. This latter is of particular value in FM multiplex adapter and multiplex circuits, to which the present invention relates. It is an advantage of the invention that expensive, accurately center tapped transformers with perfect balance are not necessary. Essentially the improved results of the present invention as a switcher are obtained by using a source of input signals with an impedance very much less than the output impedance of the switch output circuits. For example, with an impedance difference of 100 to 1 a simple filter in the output circuit or circuits will eliminate switching signal frequency to practically the same degree as the complex circuits of the patent above referred to, with a saving of a number of components and using only components of high stability, such as resistors and capacitors rather than tubes and diodes.

Essentially the invention uses a diode pair as a mixer with one frequency entering the end of one diode, and the other frequency in the junction between the diodes and the output at the end of the other diode. Neither frequency source requires accurate balancing to ground. In fact they may each be connected with one side to ground. The results are substantially perfect mixing. With the more ordinary construction where the two signals are introduced at the ends of the diodes, and the output taken from the center connecton in order to approach the quality obtainable by the present invention one of the signal sources must be very carefully balanced with respect to ground. If, in use, the balance is lost one signal will get into output reducing signal to noise ratio.

Very cheap and simple circuits for mixing are obtained which, with a suitable choice of diodes, may have an enormous range of current for satisfactory mixing. For example, as will be described below, a range of 400,000 to 1.

*Brief description of the drawing*

In FIG. 1 the input signal 1 comes from the tuner of an FM set through its cathode follower, the figure shows diagrammatically the output load resistors and bypass capacitor of the cathode follower. The source of switching signals shown at 2 is an ordinary 38 kc. synchronized oscillator, which, as illustrated in FIG. 1, is a push pull oscillator. The filters 3 and 4 in the two outputs are conventional filters with a 38 kc. notch.

Figure 1:
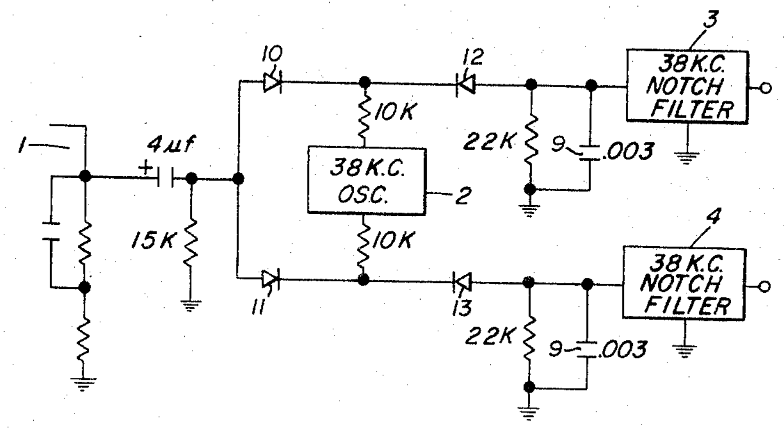
FIG. 1 is a schematic, partly in block form, an FM multiplex adapter.

The signal from the cathode follower 1 is the standard signal for FM multiplex transmission, and in accordance with the published standards of the FCC, it includes the following components: signal having the sum of the audio signals from right and left hand channels, which is customarily referred to as the $R+L$ signal, a 19 kc. synchronizing or pilot signal, and a 38 kc. signal modulated with $L-R$; the 38 kc. carrier is suppressed in the transmission and only the two side bands are present. In accordance with standard requirements, there is a pre-emphasis of the FM modulated signal. The above signals reach the anodes of diodes 10 and 11, the 38 kc. push-pull oscillator 2, which is of course synchronized by the 19 kc. synchronizing or pilot signal, impresses its 38 kc. signal on the cathodes of diodes 10 and 11 through the 10K resistors. This in effect reinserts the 38 kc. carrier which was suppressed at the FM transmitter. As in all multiplex adapters of the switching type, the voltage of the 38 kc. oscillator is much higher than the voltage of the signal from the cathode follower 1, customarily at least an order of magnitude. At each negative half cycle of the 38 kc. signal, diode 10 conducts and, of course, presents a very low impedance to the signals passing through, including the $L+R$ signal and the $L-R$ modulation of the 38 kc. The $L+R$ and $L-R$ signals are mixed, and this cancels out the R signals and effectively during this half cycle of the 38 kc. oscillator the cathode of diode 12 receives a signal corresponding to 2L and also an attenuated portion of the 38 kc. signal. The negative voltage on the cathode of diode 12 also causes this diode to conduct and so it passes the 2L and attenuated 38 kc. signals. These pass through the conventional FM deemphasis circuit 9, which restores the frequency balance of the FM output and then passes into the 38 kc. notch filter 3. This effectively removes 38 kc., leaving the 2L signal for the left hand channel loudspeaker. It should be noted that during each negative cycle of the oscillator, the diodes 10 and 12 will remain conducting regardless of the phase of the *L+R* and *L—R* signals because of the much higher voltage of the oscillator 2.

During the half cycle when the oscillator 2 has put a negative voltage on the cathodes of diodes 10 and 12, it has put a positive voltage on the cathodes of diodes 11 and 13 and so these diodes do not conduct during this half cycle. During the next half cycle of the oscillator 2 a negative voltage is impressed on the cathodes of diodes 11 and 13 and a positive voltage on the cathodes of 10 and 12, which therefore do not conduct during this half cycle. It should be noted that in accordance with FCC regulations, the *L+R* signal does not modulate the 38 kc. carrier in the original transmitter but the *L—R* signal does. Therefore, the side band of the *L—R* signal being impressed on the cathodes of diodes 11 and 13 is the reverse. In other words, *R—L*. This, therefore, cancels out the L signal and the diode 13 passses a 2R signal the attenuated portion of the 38 kc. and after going through its deemphasis circuit 9 the 38 kc. is filtered out in the filter 4.

It should be noted that diodes 12 and 13 perform a function, because if they were omitted, while the switching of diodes 10 and 12 at the 38 kc. frequency would still take place, the full amount of the 38 kc. signal in its positive half cycle would pass on and would require a more sophisticated filter 3 and correspondingly filter 4. When the diodes 12 and 13 are omitted, these positive half cycles do not pass as the diodes do not conduct them.

The impedance of the cathode follower input at 1 is approximately 270 ohms or a little more than 1 percent of the respective output load resistors shown. When diode 10 or diode 11 is conducting, it will be seen from FIGURE 1 that the 10K resistors of the oscillator 2 are in effect in series with the low impedance of the cathode follower since the conducting diodes contribute negligible resistance. This results in a heavy impedance mismatch, so that only a few percent of the 38 kc. signal is present on the cathodes of the diodes and, therefore, a much simpler filter 3 and 4 can be used. Incidentally, FIG. 1 also shows that as the attenuated 38 kc. signal has to pass through the deemphasis networks 9, these networks still further attenuate the signal, but the major attenuation can be seen to result from the mismatch of cathode follower impedance and the 10K resistors. Another way of looking at it is that when diode 10 or diode 11 is conducting, respectively, the 10K resistor is in series with 270 ohms and so constitutes a voltage divider, which is the reason for the attenuation of the 38 kc. signal. The push pull 38 kc. switching signal which alternately switches the information from one channel to the other is completely eliminated from the outputs with a very simple filter, requiring no complex circuits or careful balancing of the 38 kc. signal to ground. In fact, the signal does not need to be balanced to ground at all. However, a rough balancing is unobjectionable.

It will be seen that the switch has only four diodes, five resistors, three capacitors and two simple filters. In fact, the diodes and their output resistors and capacitors, together with the two filters, are easily mounted in the form of a printed circuit module which can be replaced at any time without requiring any balancing.

When the circuit is compared with similar circuits of the patent referred to above, bearing in mind of course that the diode pairs must be doubled in order to produce an SPDT switch, it will be seen that no tubes or extensive diode bridge are necessary, and all of these elements are eliminated without eliminating their function of removing the switching signal from the output. The same desirable result is therefore obtained with the elimination of a number of elements formerly considered necessary.

Figure 2:
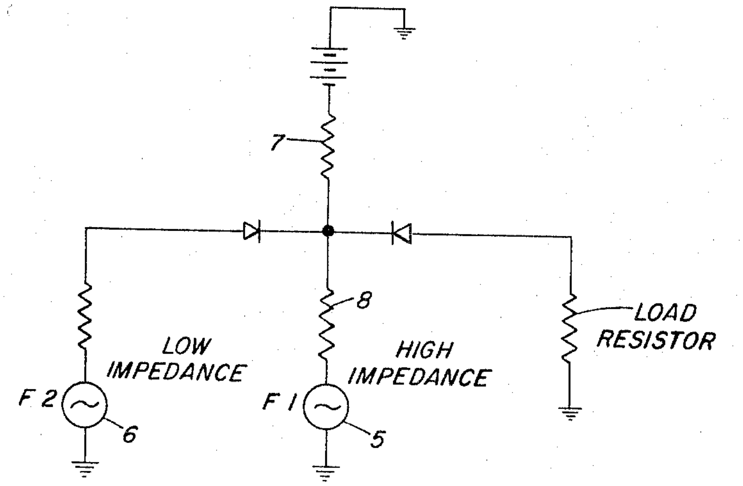
FIG. 2 is a partial schematic of a mixing circuit.

FIG. 2 illustrates, in simplified form, half of the circuit for mixing. The two sources of frequency F1 and F2, are shown at 5 and 6. When good silicon diodes are chosen an enormous range of accurate frequency multiplication results. For example, considering the diode formula for forward conduction $I=Io(e^{kv}-1)$ the current will be practically exponential over a range from $\mu a$ to 400 ma., a range of about 400,000 to 1. The circuit is very simple, it requires no tubes with power supply problems or other complications, and yet precision mixing is obtained. As described above an important advantage is that the signal sources entering the mixer need not be balanced with respect to ground, which effect the great simplifications in circuit design and increased reliability. The diodes are forward biased through the large resistor 7 so that at least a slight current flows so that the diodes are always operated in their exponential region.

I claim:

1. In a switching type FM multiplex adapter having an input adaptable for connection to the output of an FM tuner of the low output impedance type, an oscillator at multiplexing frequency, two switching means connected to the input and to the oscillator in opposite phase thereto, two output circuits from said switching means and filtering means in said output circuits for suppressing the multiplex frequency, the improvement which comprises switching and mixing circuits formed of:

(a) only two pairs of diodes connected in opposition, (b) the input circuit of the adapter being connected to one end of a diode of each pair, the multiplex frequency oscillator being connected to the junction of the diodes, and (c) the output circuits of the adapter being connected to the other ends of the other diodes.

2. An adapter according to claim 1 in which the oscillator at multiplexing frequency is a push pull oscillator.

References Cited

UNITED STATES PATENTS

| | | | |
|---|---|---|---|
| 3,242,264 | 3/1966 | De Vries | 179—15 |
| 3,225,143 | 12/1965 | Parker | 179—15 |
| 3,175,040 | 3/1965 | Von Recklinghausen | 179—15 |
| 3,167,615 | 1/1965 | Wilhelm | 179—15 |
| 3,146,311 | 8/1964 | Wolff | 179—15 |
| 3,336,584 | 8/1967 | Kaiser | 340—242 |
| 3,382,493 | 5/1968 | Loper et al. | 340—235 XR |

FOREIGN PATENTS

| | | |
|---|---|---|
| 173,653 | 1/1922 | Great Britain. |

ROBERT L. GRIFFIN, *Primary Examiner.*

R. L. RICHARDSON, *Assistant Examiner.*